United States Patent [19]
Ehle

[11] 3,870,218
[45] Mar. 11, 1975

[54] DEVICE FOR EFFECTING A CLOSE ENGAGEMENT BETWEEN LAYERS OF SHEET METAL WHEN MAKING LAMINATED PRESSURE CONTAINERS

[75] Inventor: Joachim Ehle, Essen, Germany

[73] Assignee: Fried. Krupp Gesellschaft mit beschrankter Haftung, Essen, Germany

[22] Filed: Aug. 21, 1973

[21] Appl. No.: 389,651

[52] U.S. Cl. .................. 228/4, 29/473.9, 29/493, 228/44
[51] Int. Cl. ..................... B23k 1/00, B23k 37/04
[58] Field of Search ... 29/493, 200 P, 200 B, 473.9; 228/4, 44

[56] References Cited
UNITED STATES PATENTS
1,665,815  4/1928  Mauser .......................... 228/44 X
2,187,431  1/1940  Powell ........................... 29/493 X
3,357,089  12/1967  Larsen ........................ 29/473.9 X FOREIGN PATENTS OR APPLICATIONS
1,045,046  6/1953  France ............................ 228/44

Primary Examiner—C. W. Lanham
Assistant Examiner—Victor A. DiPalma
Attorney, Agent, or Firm—Walter Becker

[57] ABSTRACT

A method of and device for making laminated pressure containers, according to which the metal sheet to be applied onto another metal sheet, e.g. of a core pipe, is provided with two rows of bores at the ends of the metal sheet to be applied. These bores are engaged by two rows of studs which are operable respectively to enter the two rows of bores and to pull toward each other the metal sheet ends provided with the bores, whereupon the pulled together ends are welded together.

1 Claim, 1 Drawing Figure

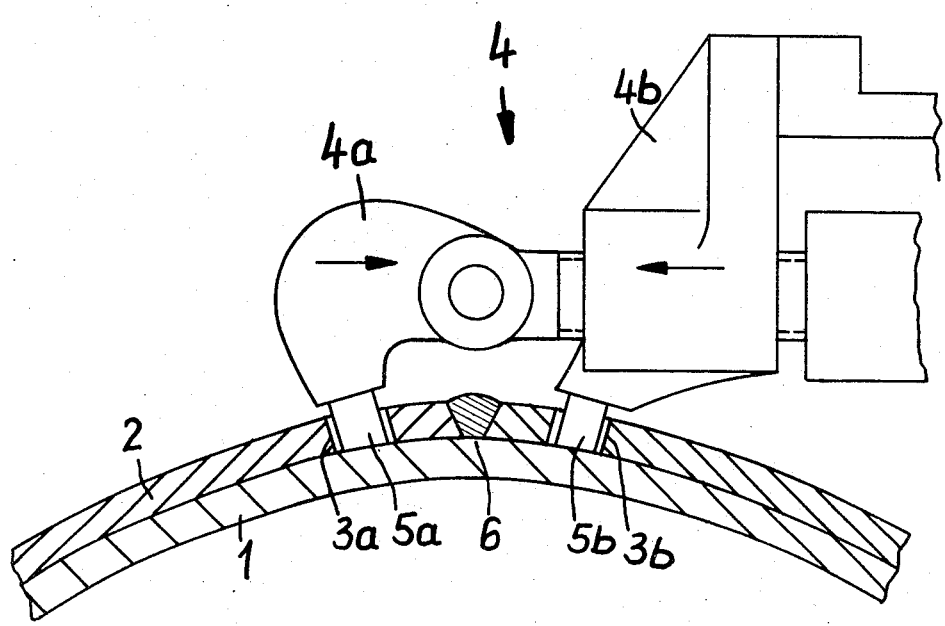

DEVICE FOR EFFECTING A CLOSE ENGAGEMENT BETWEEN LAYERS OF SHEET METAL WHEN MAKING LAMINATED PRESSURE CONTAINERS

The present invention relates to a method of and device for obtaining a close engagement between layers of sheet metal used in connection with the manufacture of laminated pressure containers.

When manufacturing cylinders or conical pressure containers as welded laminated structures, i.e. as a structure composed of a plurality of sheet metal layers which coaxially surround the core pipe and are interconnected by longitudinal and round welding seams, it is of great importance that the sheet metal layers, prior to being welded together and while being welded at their abutting longitudinal edges to form a cylinder, closely engage the core pipe, if necessary with the already previously mounted layers thereon. Only under these circumstances, a wall of such uniformity will be obtained that all layers will equally take part in the absorption of the longitudinal and transverse forces which are generated during operation by the inner pressure.

Heretofore it has been attempted to secure a close engagement of a sheet metal layer to be mounted by applying to the sheet metal layer, after it was placed around the core pipe, radially inwardly acting forces. More specifically, this was done by chains which were placed around the sheet metal layer and which were mechanically or hydraulically tightened. These and similar methods, however, have the drawback that the tightening operation is not effected directly in the sheet metal layer to be applied and that the tightening forces, which are only partially effective, will, in particular with sheet metal layers of greater thicknesses of up to approximately 25 mm, not be sufficient to bring about a satisfactory and close engagement.

It is, therefore, an object of the present invention to provide a method of and device for practicing this method which will overcome the above mentioned drawbacks.

This object and other objects and advantages of the invention will appear more clearly from the following specification in connection with the accompanying drawing, illustrating a tightening device according to the invention which during the application of the longitudinal welding seam of the first sheet metal layer to be applied to the core pipe engages this sheet metal layer, the device being shown as extending in a direction transverse to the seam.

The method according to the present invention is characterized primarily in that the sheet metal layer which is placed around the core pipe (if desired with already previously applied layers thereon) is pressed against the core pipe by pulling forces which act tangentially on the two longitudinal edges to be welded to each other.

This method may be practiced by the device according to the invention which is characterized primarily in that it comprises two rows of studs which are adapted to be tightened relative to each other and which engage bores provided in the sheet metal layer in the vicinity of the two longitudinal edges thereof.

Referring now to the drawing in detail, there is shown a tightening device according to the invention which during the forming of the longitudinal welding seam of a first sheet metal layer to be applied to the core pipe engages the sheet metal layer. The device is shown diagrammatically as extending in a direction transverse to the seam.

The sheet metal layer 2 placed around the core pipe 1 is in the vicinity of its two longitudinal edges respectively provided with two rows of bores $3a$, $3b$. The tightening device 4 engages the bores $3a$, $3b$ by means of corresponding studs or pins $5a$ and $5b$ respectively supported by two parts $4a$ and $4b$ of the device 4. By moving these parts toward each other in the direction of the arrows by means of a spindle drive or the like the device 4 causes the sheet metal layer 2 closely to engage the core pipe 1 while the longitudinal welding seam 6 is prepared.

After the seam 6 has been completed and the tightening device 4 has been removed, the bores $3a$, $3b$ may likewise be filled with welding material. However, if desired, the bores $3a$, $3b$ may also remain open and serve as airing or testing holes.

It is, of course, to be understood that the present invention is, by no means, limited to the specific showing in the drawing but also comprises any modifications within the scope of the appended claims.

What I claim is:

1. A device for making a cylindrical pressure container by means of a core pipe and at least one sheet metal layer to be placed therearound and provided with two rows of bores respectively arranged near the end edges of said sheet metal layer, which includes: first supporting means, a first series of studs pivotally supported by said first supporting means for engagement with one of the rows of bores in said sheet metal layer, second supporting means movable selectively relative toward and away from said first series of studs, a second series of studs pivotally supported by said second supporting means for engagement with the other row of bores, and means operatively connected to said first and second supporting means for actuating the same.

* * * * *

UNITED STATES PATENT OFFICE
CERTIFICATE OF CORRECTION

Patent No. 3,870,218  Dated March 11, 1975

Inventor(s) Joachim Ehle

It is certified that error appears in the above-identified patent and that said Letters Patent are hereby corrected as shown below:

On the title-abstract page the following should be added:

-- [30] Foreign Application Priority Data
August 26, 1972, Germany ........P22 42 167.4 --

Signed and sealed this 17th day of June 1975.

(SEAL)
Attest:

RUTH C. MASON
Attesting Officer

C. MARSHALL DANN
Commissioner of Patents
and Trademarks